(12) United States Patent
Kiple et al.

(10) Patent No.: US 9,077,795 B2
(45) Date of Patent: Jul. 7, 2015

(54) LATCH MECHANISM DEVICE AND METHODS OF USE

(75) Inventors: Bryan P. Kiple, Cupertino, CA (US); Michael B. Wittenberg, Mountain View, CA (US); Shayan Malek, San Jose, CA (US)

(73) Assignee: Apple Inc., Cupertino, CA (US)

( * ) Notice: Subject to any disclaimer, the term of this patent is extended or adjusted under 35 U.S.C. 154(b) by 392 days.

(21) Appl. No.: 13/421,487

(22) Filed: Mar. 15, 2012

(65) Prior Publication Data

US 2013/0239372 A1 Sep. 19, 2013

(51) Int. Cl.
*H05K 7/14* (2006.01)
*H04M 1/02* (2006.01)
*F16B 21/18* (2006.01)

(52) U.S. Cl.
CPC ........ *H04M 1/0277* (2013.01); *Y10T 24/45623* (2015.01); *Y10T 29/49826* (2015.01); *Y10T 24/45984* (2015.01); *Y10T 24/45262* (2015.01); *F16B 21/186* (2013.01)

(58) Field of Classification Search
CPC .................................................... H05K 7/1405
USPC ............ 361/740, 759, 801; 24/594.11, 595.1, 24/629, 674; 403/326
See application file for complete search history.

(56) References Cited

U.S. PATENT DOCUMENTS

| | | | | |
|---|---|---|---|---|
| 1,300,337 A | * | 4/1919 | Bourque | 24/674 |
| 2,526,790 A | * | 10/1950 | Wroblewski | 403/326 |
| 3,843,078 A | * | 10/1974 | Schon et al. | 244/135 B |
| 5,223,674 A | * | 6/1993 | Reznikov | 361/759 |
| 5,818,691 A | * | 10/1998 | McMahan et al. | 361/740 |
| 6,581,420 B1 | | 6/2003 | Ling et al. | |
| 6,695,629 B1 | * | 2/2004 | Mayer | 361/801 |
| 8,472,209 B2 | * | 6/2013 | Chen et al. | 361/801 |
| 2010/0097223 A1 | * | 4/2010 | Kruest et al. | 340/572.1 |

FOREIGN PATENT DOCUMENTS

DE 299 06 311 U1 9/1999
EP 1 749 955 A1 2/2007

* cited by examiner

*Primary Examiner* — Michael P Ferguson
(74) *Attorney, Agent, or Firm* — Kilpatrick Townsend & Stockton LLP (57) ABSTRACT

Latch mechanism devices for attaching components within a device and methods of use are provided herein. In one aspect, the latch mechanism includes a pair of deflectable members between which a protruding latch member, such as a latch pin, is inserted thereby separating the deflectable members. A latch pin can have a distal insertion portion and a proximal locking portion, the locking portion having a reduced profile so as to resiliently receive the deflectable members displaced by insertion of the latch pin so as to couple the latch pin between the cords. The latch pin can have insertion faces and locking faces angled so as to control the force required to insert and retract the latch pin from the cord pair. The latch mechanism may utilize releasing mechanisms for separating or reducing tension in the deflectable members to facilitate retraction of the latch pin.

17 Claims, 10 Drawing Sheets

LATCH MECHANISM DEVICE AND METHODS OF USE

BACKGROUND

In many conventional devices, particularly peripheral devices such as portable media devices and cell phones, internal electrical components are attached within an external housing or cover of the device with screws or other such rigid attachment means. The screws or rigid attachment means secure the internal electrical components, such as a circuit board, within the hard external shell during every day use of the device.

In many applications, it may become necessary to detach the internal components from the external shell, such as when servicing or repairing the device, such applications not typically being performed by an end user of the device. In disassembling the device, the attributes of the attachment mechanisms which provide for secure attachment between the two components can make disassembling the device more difficult and time consuming. Additionally, to facilitate disassembly of the components, the screws or rigid attachment means typically extend through corresponding holes in the device housing so as to be easily accessed from outside the device. Apart from being visually unappealing, such attachment means may compromise the integrity of the housing, may be more easily damaged over time, and may also subject the device to being easily disassembled by the end-user or unauthorized persons.

SUMMARY

Accordingly, embodiments of the present invention provide a latch mechanism that overcomes the drawbacks of many conventional attachment mechanisms described above. In one aspect, embodiments can provide for a latch mechanism that releasably attaches a first component to a second component, such as an internal electrical component within a housing of the device while maintaining the structural integrity of the attachment mechanism as well as the housing of the device. More specifically, embodiments relate to a latch mechanism having a latch member protruding from a first component that latches between two deflectable members attached to a second component so as to couple the first and second components together. For example, the latch mechanism can include a latch pin insertable between cords of a cord pair so as to deflect and separate the cords until they are resiliently received within a locking portion of the latch pin, such as a circumferential groove or recess in the latch pin, thereby latching the components together.

According to one embodiment, the latch mechanism includes at least two deflectable members disposed adjacent and spaced apart from each other, each deflectable member being coupled to the second component, and a latch member protruding from the first component. The latch member includes a distal portion for inserting between the at least two deflectable members along an insertion axis and a locking portion proximal of the distal insertion portion for resiliently receiving the at least two deflectable members. The distal insertion portion is dimensioned to facilitate insertion of the latch member therebetween and to deflect the at least two deflectable members away from one another, and the locking portion being dimensioned to resiliently receive the at least two deflectable members upon advancement of the latch member between the deflectable members and to inhibit retraction of the latch member from between the at least two deflectable members, thereby attaching the first and second components.

The at least two deflectable components may include a pair of cords, the cords being pulled taught and extending through a common plane, and the latch member includes a latch pin insertable between the cords so as to displace the cords away from one another. Often, the cords are wires, such as stainless steel music wire, that is pulled taught and the cords are positioned so as to be substantially parallel, although the cords may be configured to cross. The latch member may include a latch pin having a distally tapered insertion portion and a proximal locking portion comprising a circumferential groove or recess so as to resiliently receive the cords displaced by advancing the latch pin inserted therebetween. The deflectable member or cord pairs may be rigidly coupled to the second component at either end or may be rigidly coupled at one end and coupled to a moveable member at the other, the moveable member acting as a releasing mechanism so that movement of the member reduces tension in one or both cords to reduce the retraction force and allow for unlocking and removal of the latch pin from between the cords. The movement of the cords may also be constrained in one or more direction along an axis, such as by an L-shaped block, so as to facilitate movement of the cords in one direction and inhibit movement in the opposite direction. Additionally, this aspect may be used to inhibit movement of the cords in more than one direction or along more than one axis. The latch pin can include insertion faces in the insertion portion and/or locking faces in the locking portion that are angled so as to control the peak insertion force and/or peak retraction force, respectively, needed to insert or remove the latch pin from between the cords. In another aspect, the latch mechanism includes cords and locking faces in the locking portion of the latch member that are offset along an insertion axis, and insertion faces that are symmetrical about the insertion axis, so as to provide an increased retention or retraction force relative an insertion force.

Methods of using a latching device in accordance with many embodiments are also provided herein. An example method for attaching components within a device using a latching mechanism includes inserting a latch member protruding from a first component between deflectable cords of a cord pair attached to a second component to increase separation between the cords, and attaching the latch member to the cord pair by advancing the latch member between the cords until the cords are resiliently and received within a locking portion of the latch member. The latch member can be inserted by inserting an insertion portion of the latch member along an insertion axis, the insertion portion having a reduced profile along the insertion axis to facilitate insertion between the cords. Often, inserting the latch member further includes advancing the latch member along the insertion axis until an intermediate portion having a dimension greater than an initial gap distance between the cords to separate the cords. The locking portion can have a reduced profile along the insertion axis relative to the intermediate portion so as to resiliently receive cords displaced by advancing the intermediate portion therebetween. The latch mechanism can be releasable such that retraction of the latch member with a required retraction force retracts the latch member from between the cords of the cord pair. The methods may include steps of reducing the tension in the cords to facilitate retraction of the latch member such as by moving a moveable member attached to one or both cords or inserting a wedge or ramp surface against one or both cords to separate and/or reduce tension in the cords so that the latch member may be removed.

Various embodiments of the present invention may incorporate one or more of these and various other features described herein. A better understanding of the nature and advantages of the present invention may be gained by reference to the following detailed description and the accompanying drawings.

DETAILED DESCRIPTION

Embodiments of the present invention generally relate to latch mechanisms for coupling two components within a device, in particular for releasably attaching a multi-layer board having electrical components within an outer housing component of a peripheral device. More specifically, embodiments relate to a latch mechanism having a protruding latch member attached to a first component that latches between two deflectable members attached to a second component so as to couple the first and second components together. In an embodiment, the latch mechanism includes a latch pin insertable between cords of a cord pair so as to deflect and separate the cords until they are resiliently received within a locking portion, such as a circumferential groove or recess in the latch pin, thereby locking the components together. The latch pin may include an insertion portion dimensioned to facilitate insertion of the latch pin between cords of an associated cord pair and a proximal locking portion dimensioned so as to resiliently receive the cords displaced by inserted the latch pin. In various embodiments, each of the insertion and locking portion include faces that are dimensioned and angled to control a peak insertion and retraction or locking force, often so that the insertion force is substantially less than the locking force or the force required to retract the latch pin from between the cords.

In many embodiments, the latch mechanism allows an multi-layer board having electrical components to be easily attached within a device housing component and subsequently released, while maintaining a robust connection when attached and maintaining the integrity of the housing component. The latch mechanism may be configured so as to be easily accessed and released by a user, such as a service provide or repair technician, using an appropriate tool, but is largely inaccessible to an end-user. Often, the latch mechanism provides a secure connection, without being completely rigid, such that the internal components of the device are more shock resistant to forces applied to the outer housing, such as when the device is dropped. The latch mechanism may be contained within the device so that holes through the housing are not required, such as the holes associated with screws and other rigid attachment means in many conventional devices. Thus, a latch mechanism in accordance with many embodiments, overcomes many of the above described drawbacks of conventional attachment means while avoiding the visual impact of externally accessible screws, thereby improving the aesthetic appearance of the device.

In an embodiment, the latch mechanism includes a pair of deflectable members, such as a pair of cords, spaced a distance apart so that insertion of a latch member, such as a latch pin, is inserted, thereby deflecting the deflectable members away from one another until received within a locking portion of the protruding member. In one aspect, the protruding member or latch pin is configured with an insertion portion having a reduce insertion profile along an insertion axis and a locking portion having a reduce profile along a retraction axis. The insertion axis is the axis along which the latch member is inserted between the cords of the cord pair, while the retraction axis is the axis along which the latch member is retracted from between the cords. Although the retraction axis is often aligned with the insertion axis, in some embodiments, the axis may differ. For example, the latch pin may be inserted along an axis at an inclined angle of 45 degrees, then rotated down into the locked position within the device, and may be removed by retracting the latch pin at an inclined angle of about 30 degrees. Often, each of the insertion portion and locking portions include insertion and locking faces, respectively, that are dimensioned and angled relative to the associated axis so as to control the force required to insert the member as well as the locking force needed to be overcome to retract the member once received within the locking groove. In one aspect, the latch mechanism includes one or more latch pins extending from an end of an insertable circuit board that are received between one or more pairs of cords disposed within an exterior housing or case so as to secure the circuit board within the exterior housing of a device.

In an embodiment, the latch mechanism releasably attaches an internal component, such as a printed circuit board or other multi-layer board, within an outer housing component or enclosure of a device, such as a cell phone, portable multimedia device or other such peripheral device. The latch mechanism may be contained within the enclosure or housing and may be accessed by disassembling the housing or through an existing hole or recharging port in the housing. Example devices having internal components attached within an outer housing or enclosure that may utilize such a latch mechanism are described in U.S. patent application Ser. Nos. 12/239,662; 12/794,429; 12/967,234; and 12/976,879, the full disclosures of which are incorporated herein by reference in their entirety.

A further understanding of the invention can be gained by referring to the accompanying figures depicting varying examples of latch mechanisms, in accordance with many embodiments.

Figure 1A:
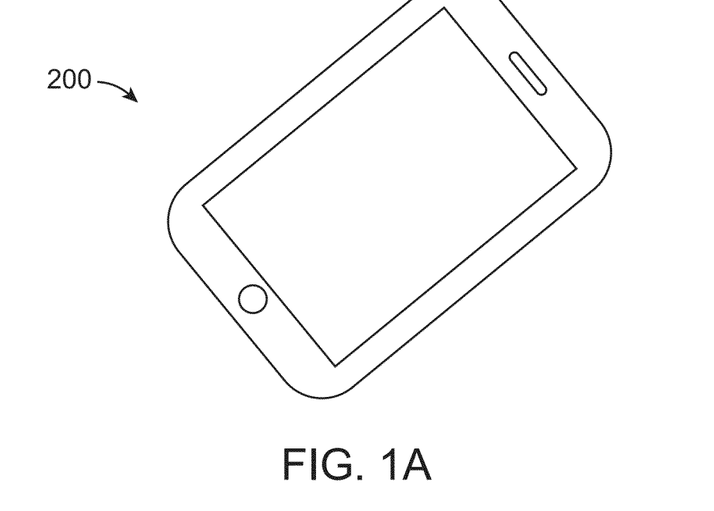
FIG. 1A illustrates a peripheral device in which a latch mechanism can be used, in accordance with many embodiment of the invention.
Figure 1B:
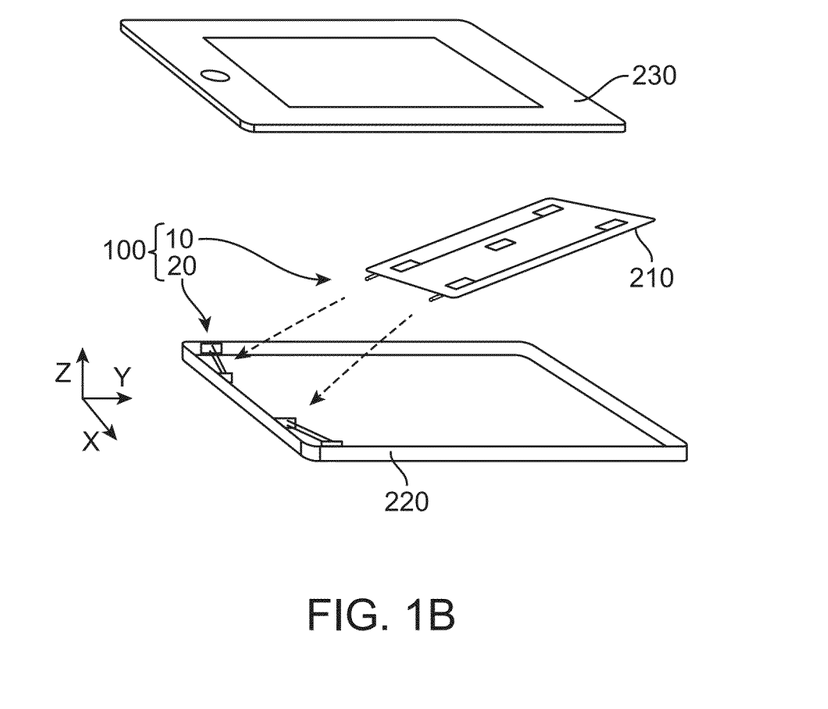
FIG. 1B illustrates an exploded view of the device in FIG. 1A showing the latch mechanism for coupling a multi-layer board within an exterior housing of the device.

FIG. 1A shows an overview of a portable multimedia device 200 utilizing a latch mechanism 100, in accordance with embodiments. FIG. 1B shows an exploded view of device 200, depicting an outer housing including an upper housing component 230 and a lower housing component 220, and an internal electronics circuit board member 210 positioned between the upper and lower housing components. When fully assembled, the upper and lower housing components 230 and 220 interlock with the internal circuit board member 210 disposed within to form the assembled device 200. The latch mechanism 100 secures the internal circuit board member 210 within the case, typically constraining movement of the internal circuit board member 210 along one or more of the x, y and z axes. In this embodiment, the latch mechanism 100 includes a protruding latch member 10 attached to each bottom corner of an internal circuit board member or multi-layer board 210 that releasably couples with a corresponding pair of deflectable members 20, such as a pair of cords or cables, attached to the inside of the lower housing component 220.

The lower housing 220 can include two pairs of cords 20 disposed within, one at each corners on the bottom end of the lower housing 200, each pair configured to receive a corresponding latch member 10 of the multi-layer board 210 in a locked configuration. In many devices, the upper housing 230 forms the outside housing of the display in the assembled device, and the lower housing 220 contains one or more multi-layer boards, such as internal circuit board member 210. In assembling the device, the multi-layer board 210 is tilted downward at an angle and slid into the lower housing 220 (as shown by the dotted lines in FIG. 1B) so as to insert each of the latch members 10 within a corresponding pair of cords 20 to secure the multi-layer board 210 within the lower housing 220. Although the cord pairs are illustrated positioned at a slight angle, it is appreciated that the cord pairs and latch pins may be configured in a variety of differing shapes, sizes and extend in various directions so long as they engage so as to latch the components together as described in any of the embodiments herein.

Figure 1C:
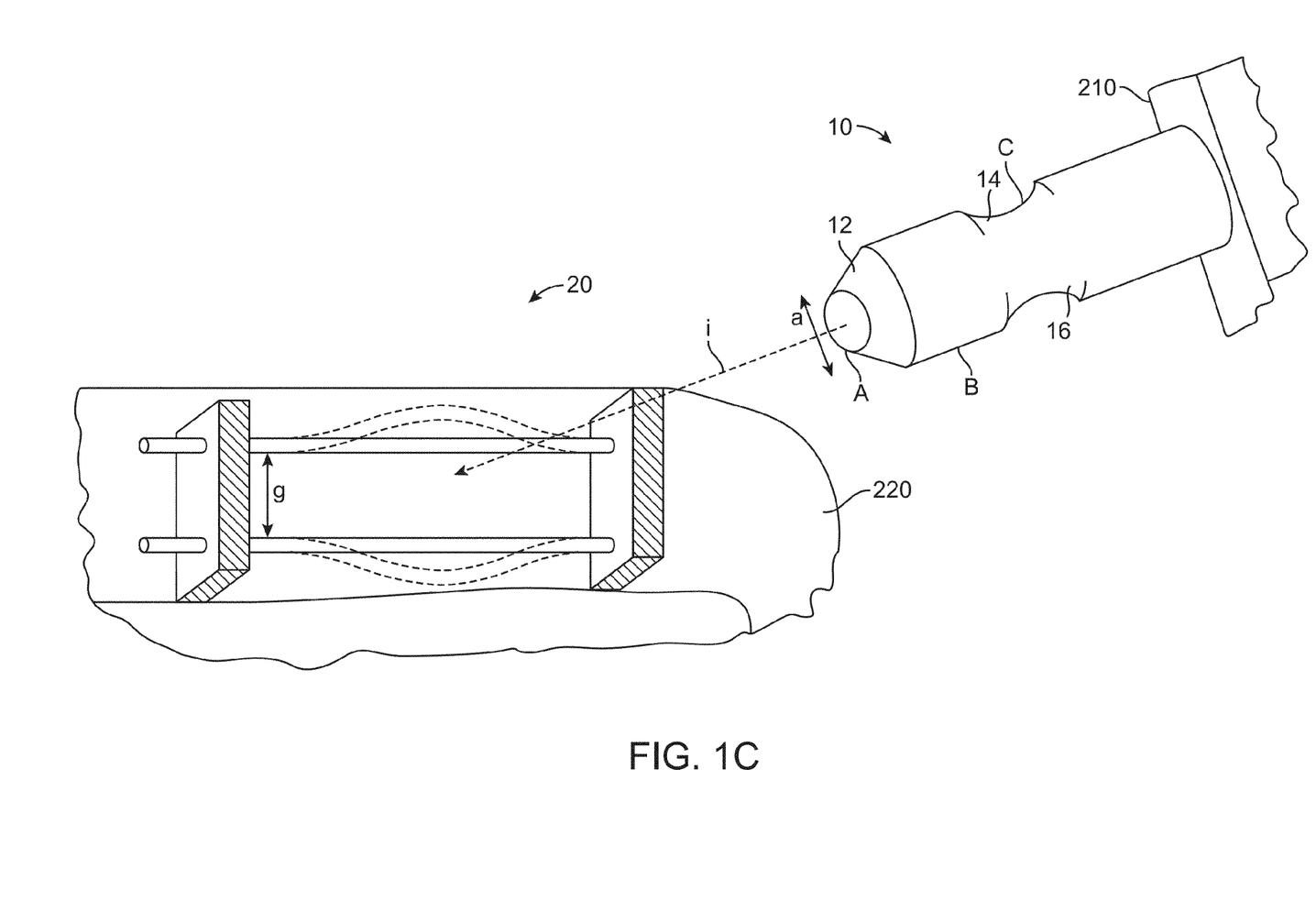
FIG. 1C illustrates a detail view of a latch mechanism, in accordance with many embodiments.

FIG. 1C illustrates a detail view of an example latch assembly 100 including a protruding latch member or pin 10 insertable between a pair of deflectable cords 20 by advancing the latch member 10 distally between the cords 20 along insertion axis (i) (as shown by the dashed arrow). The cords of each cord pair 20 extend between rigid blocks attached to the inside of the lower housing 220 are generally substantially parallel, pulled taught, and separated by a distance (g), the cords typically being fixedly attached to the inside of the lower case 210, such as through a swage, rivet or weld for example, so as to provide tension in the cords (or alternatively to bias the cords toward an initial position having a desired distance between cords, such as the embodiment of FIGS. 9A-9B).

The protruding latch member or pin 10 generally includes a distal insertion portion A having a diameter (a), and a locking portion C proximal of the insertion portion A, there often being an intermediate portion B therebetween having a diameter (b) greater than the gap distance (g) between the cords of the pair 20. As the latching pin 10 is inserted between the cords 20, the cords are deflected apart (as shown by the dotted lines) and the latching pin 10 is advanced until the deflected cords 20 are resiliently received within the locking portion C, the locking portion having a diameter less than that of intermediate portion B. The force required to insert the latching pin, as well as the force required to retract the latch pin or to continue to advance the pin (often referred to as the locking forces) may be controlled by the geometry of the insertion face 12 and locking faces 14 and 16 of the latching pin 10. These aspects are described in further detail in the description of FIGS. 5A-5D and FIGS. 6A-6C.

Figure 2A:
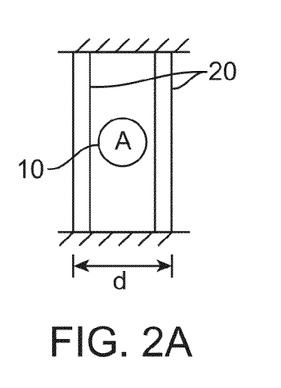
FIGS. 2A-2C and 3A-3C illustrate sequential cross-sectional and overhead views during insertion of a latch pin between cords of a cord pair in the latch mechanism of FIG. 1C.
Figure 2B:
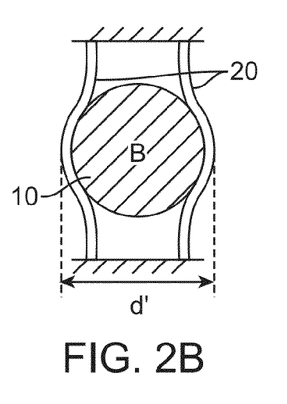
Figure 2C:
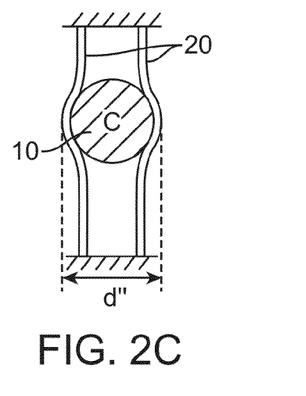
Figure 3A:
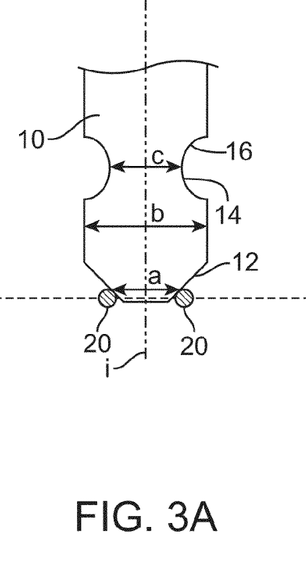
Figure 3B:
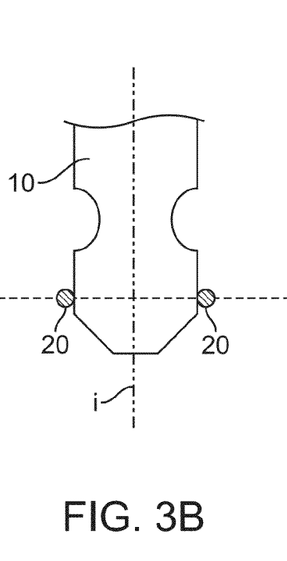
Figure 3C:
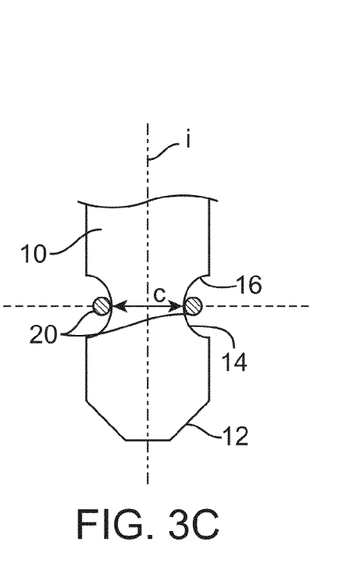

FIGS. 2A-2C and 3A-3C illustrate sequential cross-sectional views (along a plane extending through the cord pair) and overhead views, respectively, during insertion of a latch member 10 between cords of a cord pair 20 from initial an insertion position to a latched or locked position. In FIGS. 2A and 3A, the latch member 10 is inserted distally between the deflectable member, the insertion portion A tapering distally to a diameter (a) less than an initial distance (d) between non-displaced cords 20. As the latch pin 10 is advanced further, each of the cords 20 slide along the insertion face 12 which transfers a component of the insertion force perpendicular to the insertion direction so as to push the cords apart to a distance (d') to allow advancement of intermediate portion B having an increased diameter (b), as shown in FIGS. 2B and 3B. The latch pin 10 is further advanced along the insertion axis (i) until the displaced cords are resiliently received within the locking portion C of the latch pin 2, the locking portion having a diameter less than (b) but often greater than the distance (d) so that the cords are slightly displaced when positioned within the latched or locked position within the locking portion so as to exert an inwardly directed force on the latch pin 10 and secure the latch pin 10 to the cord pair. The angle of the locking face 14 and 16 inhibit retraction or further advancement, respectively, of the latch pin 10 providing a robust attachment between the components.

In one embodiment, the angle along which locking faces 14 and 16 extend is more perpendicular to the insertion direction than the angle along which the insertion face 12 extends, so that a force required to insert the latch pin 10 is substantially less than a force required to retract and/or further advance the latch pin 10 out of the locking position. The locking portion C may be dimensioned so as to allow slight longitudinal movement of the latch pin 10 in the locked position so that the secure coupling between latch pain 10 and cord pair is not completely rigid. Additionally, tension of the cords in the locked position may be configured so as to allow slight movement in the z-direction. These aspects are advantageous over the rigid coupling in many conventional devices in that this slight movement may allow the internal components of the device to be more shock-resistant so as to absorb forces of impact over the useful life of the device.

Figure 4A:
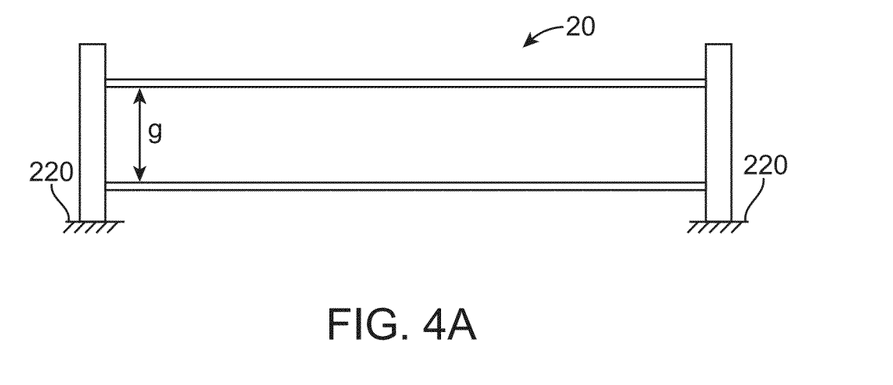
FIGS. 4A-4B illustrate latch mechanisms in accordance with the present invention.
Figure 4B:
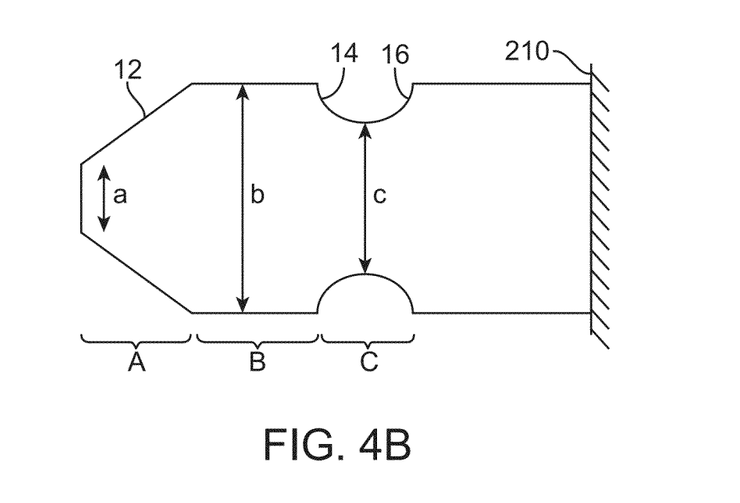

FIGS. 4A-4B illustrate detailed views of a cord pair and latch pin in accordance with many embodiments. In this embodiment, the cord pair 20 includes two lengths of steel cable or wire, such as standard music wire typically having a diameter of 0.3 to 0.5 mm, spaced apart by a gap distance g, such as a 0.2-0.5 mm gap when the cords are non-displaced. Generally, each of the cord lengths are separate members attached to the lower housing 210, although the two cords may be formed by a single loop of wire. This loop configuration would allow for increased tension as each cord is displaced, since displacing one cord would increase the tension on the adjacent cord length. The latch pin 10 is an elongated roughly cylindrical member extending a length along the insertion axis and may be about 2-3 mm in length. The latch pin 10 can include an insertion portion A, an intermediate portion B and a locking portion C, the distal insertion portion A having a distal dimension a, which is perpendicular to the insertion axis and less than the gap distance g between non-displaced cords, the intermediate portion B having a major perpendicular dimension b that is greater than gap distance g, such as about 0.8 mm, and the locking portion C proximal of the intermediate portion B having a perpendicular dimension perpendicular less than dimension b of the intermediate portion, but often greater than dimension a of the insertion portion or gap distance g.

FIGS. 5A-5D show force diagrams illustrating how the geometry of an example latch pin 10 affects the insertion and locking forces associated with the latching mechanism. In particular, the force diagrams illustrate a relationship between an incline or decline angle of an insertion face of the latch pin 20 and the force needed to displace the cords of the cord pair 20 sufficiently to allow insertion of the latch pin 20 therebetween. It should be noted that this same relationship can be used to determine the locking forces, also referred to as the force required to retract the latch pin 20 from the cords disposed within the locking portion C of the latch pin 10, and to configure the angle and dimensions of the locking faces 14, 16 relative to the insertion axis (and/or a refraction axis) so as to control the locking force of the latch pin 10.

Figure 5A:
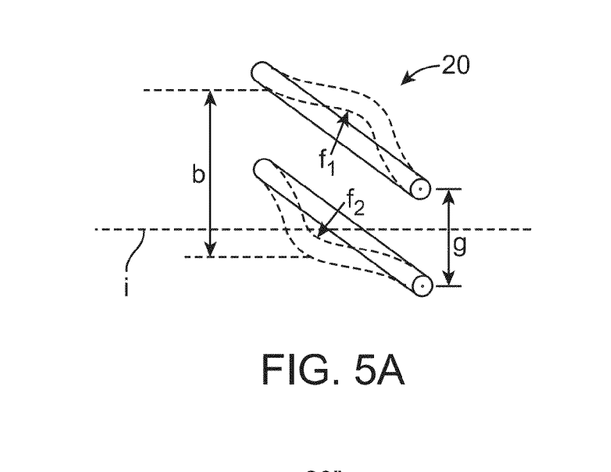
FIGS. 5A-5D illustrate force diagrams on a latch pin and cord pair, in accordance with many embodiments.
Figures 5B, 5D:
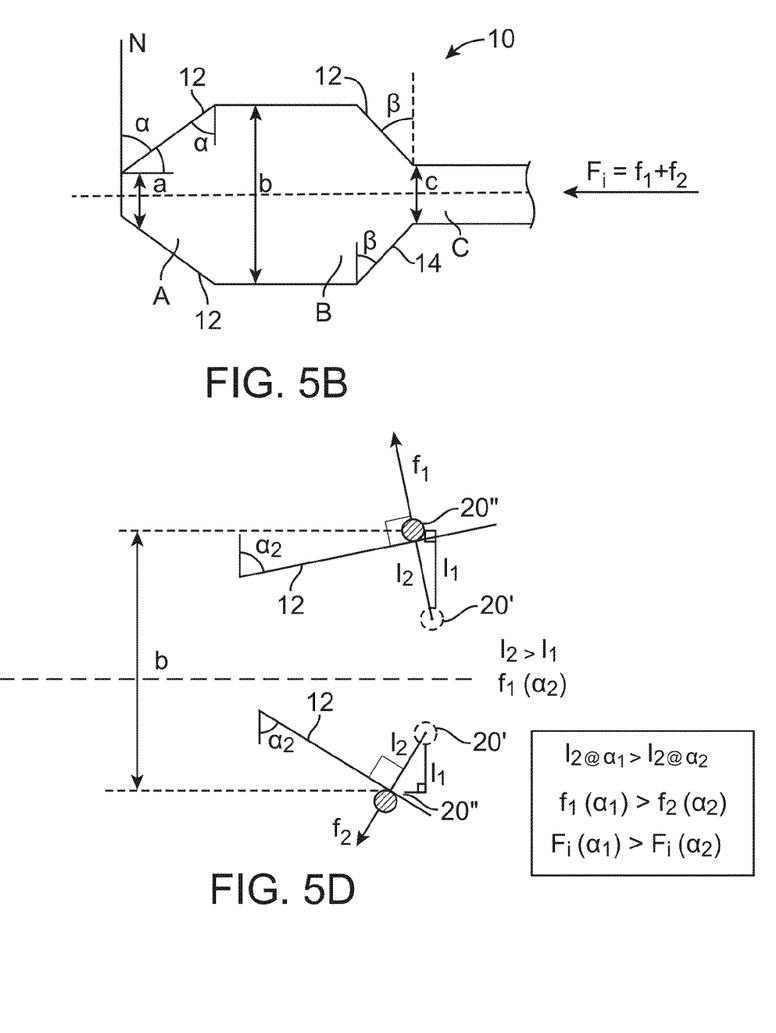

FIGS. 5A-5B illustrate a cord pair 20 and a corresponding latch pin 10 of a latch mechanism in accordance with many embodiments. As shown in FIG. 5A, for a latch pin 10 having a major dimension (b) along its insertion profile, the cords of the cord pair 20 must be displaced to increase the gap distance (g) to at least a distance equal to (b) to allow passage of the latch pin 10 therebetween. Forces $f_1$ and $f_2$ are the forces needed to displace each of the cords to obtain a gap distance of (b). In general, the forces are applied to each of the cords of cord pair 20 by angled faces 12, 14 of the latch pin 10 during insertion. The latch pin 10 is advanced distally with an insertion force F along the insertion axis. As the latch pin 10 advances between the cords of the cord pair 20, opposing insertion faces 12 apply forces $f_1$ and $f_2$ in a direction perpendicular to the respective insertion faces 12.

Figure 5C:
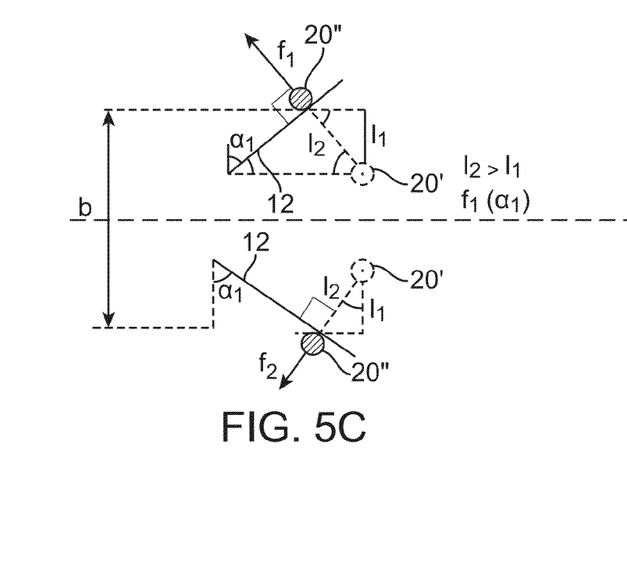

As illustrated in FIGS. 5C and 5D, the required insertion force $F_i$ as well as the required retraction force $F_r$ or locking force can be controlled by increasing or decreasing the angle at which the insertion faces 12 or locking faces 14, 16 incline or decline. For description purposes, the angle of the insertion face 12 (as measured from Normal axis (N) is $\alpha$, while the angle of the locking face 14 measured from the axis N is $\beta$. As can be seen with reference to FIGS. 5C and 5D, the greater the insertion face angle $\alpha$, the more shallow the insertion face 12 is relative to the insertion axis (i). As the latch pin 10 is inserted between the cords of the cord pair 20, the forces f1 and f2 are applied to the respective cords of cord pair 20 in a direction perpendicular to the associated insertion face 12. As shown in FIG. 5C, directing force $f_1$ and $f_2$ partially in a distal direction along the insertion axis (i) causes the distance by which each cord is deflected (from original, non-deflected cord position 20' to deflected cord position 20") to increase such that $1_2$ is greater than $1_1$. As shown in FIG. 5D, increasing a to create a more shallow insertion face reduces the component of forces $f_1$ and $f_2$ in the distal direction such that the distance by which each cord is deflected (from original non-deflected cord position 20' to deflected cord position 20") is less than when using a latch pin 10 having a less shallow insertion face 14 (as in FIG. 5C). The forces $f_1$ and $f_2$ may be determined according to a variety of equations, including the following equation: F=4 DT/L, where F is the force applied to the cord in a direction perpendicular to the cord; D is the deflection or displacement of the cord; T is the tension of the wire and L is the length of the cord or wire.

These force components in each configuration can be readily determined using standard trigonometric equations based on angles $\alpha$ (or angles $\beta$ when calculating retraction or locking forces), such that the insertion forces and/or locking forces associated with a particular latch mechanism 100 can be controlled by configuring the angle of the associated faces of the respective latch pin 10 to provide the desired insertion or locking force. As shown in FIG. 5B, for example, since angle $\beta$ of locking face 14 is less than angle $\alpha$ of insertion face 12, the force needed to displace the cords when disposed within the locking portion C by proximally retracting the latch pin 10 is substantially greater than the force required to insert the latch pin 10 between the cords using insertion faces 12. This aspect is advantageous as it allows the internal multi-layer board 210 to be easily coupled within the lower case 220 with relatively low force, while still providing a secure attachment with relatively high locking forces.

It should be noted that the above equations provide one example of how the forces can be calculated and various other equations may be incorporated into these or other appropriate equations known to one of skill in the art to account for various other factors. For example, the insertion force may be calculated as a function of one or more factors associated with the latch mechanism, including but not limited to the dimensions of the latch member, the gap distance between cords, the tension, dimensions, and/or material properties of the cord(s), and the angle of the faces of the latch member. Additionally, the deflectable members of each pair may differ from one another considerably. For example, a latching mechanism may include a pair of members for receiving a latch pin therebetween, wherein one member may be deflectable while the other may be substantially rigid, such that insertion and refraction of the latch member deflects one member away from the other to provide many of the features of latch mechanism described herein.

In the embodiment shown in FIGS. 5A-5D, the cords are largely identical, each having the same tension, and the opposing insertion faces 12 and locking faces 14 are substantially symmetrical about the insertion axis (i), such that $f_1=f_2$. It is appreciated, however, that any of these aspects could be altered as desired to change forces $f_1$ and $f_2$ as desired. For example, the cords and opposing faces of the latch pin 20 may differ to provide differing characteristics and alter the insertion and/or retraction or locking forces associated with the latch mechanism, such as any of the configurations shown in FIGS. 6A-6C, 7A-7C and 8A-8E.

In various embodiments, the insertion faces and/or geometries and attributes of the cord pair and latch member are configured so as to provide a peak insertion force between 0.2 kgf and 4 kgf, such as about 1 kg. The locking faces and/or geometries and attributes of the cord pair and latch member are configured are configured to provide a peak locking force between 4 and 8 kfg, such as about 6 kgf. The latch member and cord pair may be configured, as described above, so as to provide insertion and retraction forces such that a ratio of peak insertion force to peak retraction force ratio is between 1/10 and 1, e.g., about 1/6.

Figure 6A:
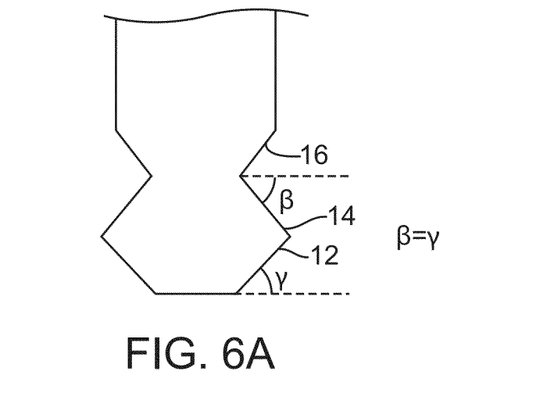
FIGS. 6A-6B illustrate latch mechanisms, in accordance with the present invention.
Figure 6B:
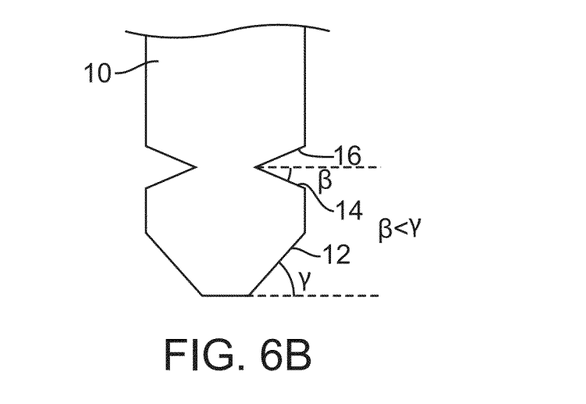
Figure 6C:
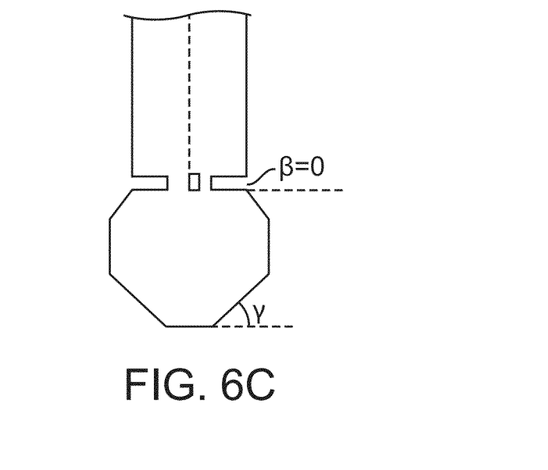

The embodiments shown in each of FIGS. 6A-6C further illustrate the above aspects. FIG. 6A illustrates a fully reversible latch pin 10 in which the angle $\alpha$ of the insertion faces 12 is equal to the angle $\beta$ of the locking face 14 such that the insertion force $F_i$ would be equal to the retraction force $F_r$. This configuration may be useful in applications where easy attachment and release is desired, such as in an application where components would be frequently removed or replaced. FIG. 6B illustrates a locking latch pin 10 in which angle $\beta$ of locking face 14 is considerably less than angle $\alpha$ of insertion face 12 such that the locking force is considerably greater than the insertion force. This configuration is more useful in application where release of the first component is less frequent. Both the configurations in FIGS. 6A and 6B are unassisted release mechanism in which the latch mechanism can be release simply by applying the required retraction force.

FIG. 6C illustrates a fully locking latch pin 10 in which the angle β of the locking face is 0 degrees, such that almost no retraction force would be sufficient to remove the latch pin 10. This configuration may considered fully locking and used in application where release of the first component is undesirable, or may be used as an assisted release latch mechanism, requiring an additional mechanism to assist in releasing the latch pin 10 from the cords. Such assist mechanism are referred to herein as releasing mechanisms, such as shown in the embodiments of FIGS. 8B-8D. In these embodiments, the releasing mechanism 30 provide additional forces to separate cord of cord pair 20 disposed within the locking portion or reduce tension in the cords to facilitate release of the latch pin 10 from the associated cords.

Figure 7A:
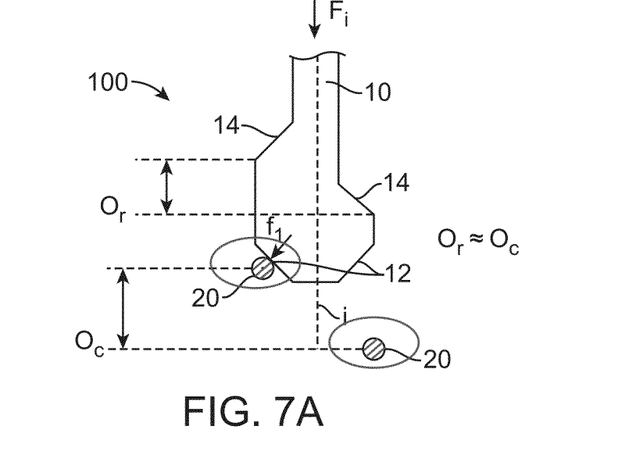
FIGS. 7A-7C illustrate a latch mechanism having a cord pair with offset cords and a latch pin with locking faces offset along the insertion axis.
Figure 7B:
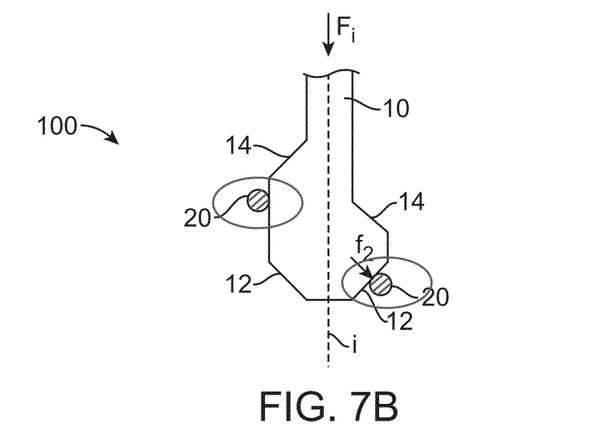
Figure 7C:
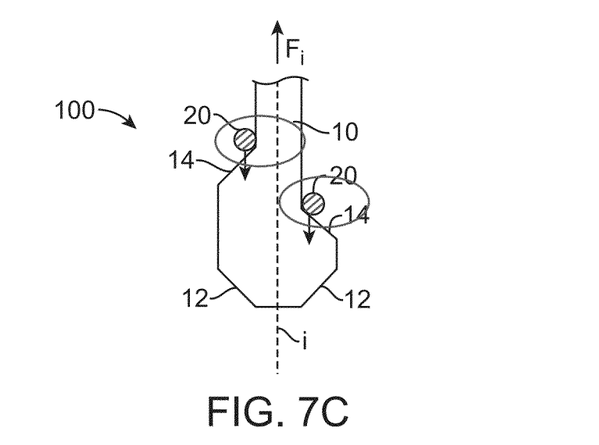

FIGS. 7A-7C illustrate an embodiment of a latch mechanism 100 having offset locking faces 14 as well as offset cords, each of which are axially offset along the insertion axis (i), while the insertion faces 12 remain substantially symmetrical along the insertion axis (i). Often, the axial distance by which the cords are offset ($O_c$) corresponds to the axial distance by which the locking faces 14 are offset ($O_r$), such that lateral displacement of the cords during insertion of the latch pin 10 is at least partly separated, thereby reducing the insertion force while maintaining the locking forces since the offset locking faces 14 simultaneously engage the corresponding offset cords in the locked portion in response to a retraction force $F_r$. For example, as shown in FIG. 7A, the more proximal cord of the offset cord pair 20 is displaced by a corresponding insertion face 12 of latch pin 10 before the other cord is contacted. Separately displacing the cords allows the majority of the insertion force $F_i$ to be used to displace each cord, as shown in FIG. 7B. Once each cord is received with the locking portion, the latch pin 10 provides an increased locking force, since the retraction force $F_r$ is countered simultaneously by each of the offset cords engaged against corresponding offset locking faces 14 (as shown by the arrows in FIG. 7C). This configuration may be incorporated into any of the embodiments described herein.

FIGS. 8A-8E illustrate cord pairs in accordance with various embodiments. Often, the cords of the cord pair are rigidly mounted to the inside of the device housing at one or both ends. The latch mechanism 100 may include a releasing mechanism 30 to exert a force on the cords to separate the cords and assist in releasing a latch pin 10 used with the described cord pair 20.

Figure 8A:
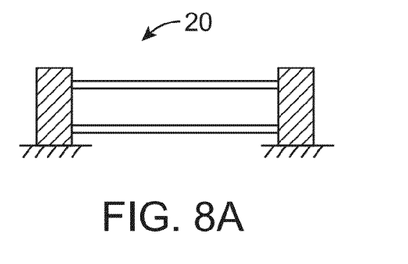
FIGS. 8A-8E illustrate various cord pairs and releasing mechanism, in accordance with many embodiments.
Figure 8B:
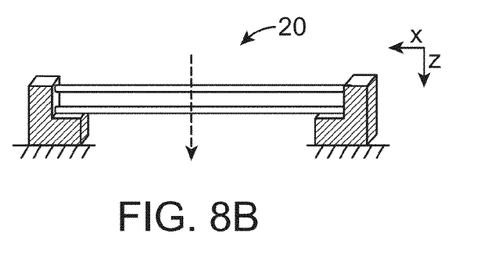
Figure 8C:
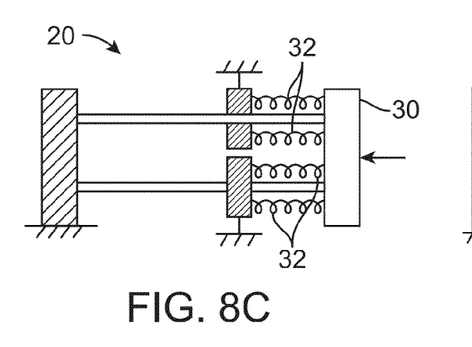
Figure 8D:
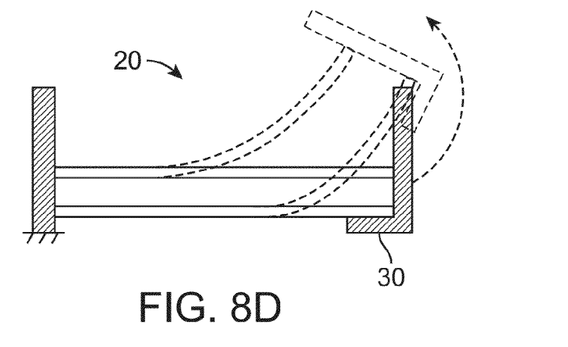

FIG. 8A illustrates a rigid mount cord pair 20 in which each cord is rigidly mounted, such as being riveted, screwed, or welded to a block, or otherwise attached to the inside of a device housing component. In such embodiments, often, deflection of the cords can alone constitute the action of locking and unlocking of the device. For example, the a latch pin 10 when used with a rigid mount cord pair 20 may be unlocked by retracting with sufficient force to separate the cords and allow the latch pin 10 to be released from the associated cord pair 20.

FIG. 8B illustrates a rigid mount cord pair 20 in which movement of at least one of the cords is constrained by a rigid member, such as the block to which the cords are affixed. This aspect may facilitate insertion of a latch member 10 in between an associate cord pair 20 by inhibiting distal movement of one or both cords in the insertion direction (positive x-direction) so that a majority of the insertion force is used to push the cords apart, whereas proximal movement of the cords is not so limited, thereby increasing the locking/retraction forces. This aspect may also be used to absorb energy in one direction, such as in a shock absorber, to prevent forces applied to the device in a z-direction from inadvertently releasing the latch mechanisms.

FIG. 8B illustrates an embodiment having a releasing mechanism 30. The cord pair is mounted on one end to a rigid block and to a releasing mechanism 30 at the opposite end. The releasing mechanism 30 includes a movable block attached by one or more spring members 32 to a rigid block, so as to provide tension in the cords and/or to bias the cords to a desired position. In this embodiment, the cord pair 20 provides for secure coupling with an associated latch pin 10 as described in any of the embodiments above. By applying a force against the movable block 30, the tension in the cords is reduced, thereby reducing the refraction force required to remove an associated latch pin 10 and allowing for release of the latch.

FIG. 8C illustrates a rigidly mounted cord pair 20 having a side release mechanism. At least one of the rigid blocks between which the cords extends can be moved laterally from the cords and/or rotated so as to reduce the tension in one or both cords, thereby allowing release of a latch pin 10 disposed within.

FIG. 8D illustrates an alternative cord pair 20 having a releasing mechanism 30. The cords are attached to a rigid block at one end and to a moveable wedge of the releasing mechanism 30 at the other. A spring member 32 extending between the cords near the wedge member provides sufficient tension in the cords so as to facilitate latching of the cords with an associated latch member 10 as described herein. Additional spring members 32 may bias the wedge so as to maintain the position of the wedge 30 and provide for additional tension in the cords when in the non-displace position. Applying a force on the movable wedge 30 toward the cords reduces the tension in the cords and the inclined wedge faces force the cords apart, thereby allowing for easy release of a latch pin 10 disposed therebetween. The releasing mechanisms described herein can be actuated by a user, such as a service technician, using a tool inserted into the device through a hole, such as an exiting hole or a recharging port, so as to release the device. Since release of the latch mechanism in such a manner requires particular knowledge of where to apply the releasing force, and often a special tool for applying the force, this aspect is particularly useful in preventing an end-user from disassembling the device. In contrast, many conventional devices utilizing visible screws are easily dismantled, and often such coupling mechanisms are prone to becoming loose over time. As many of the latch mechanisms described herein are entirely contained within the device housing, inadvertent release of the device by a user or from various forces impacting the device is unlikely.

Figures 8E, 8F:
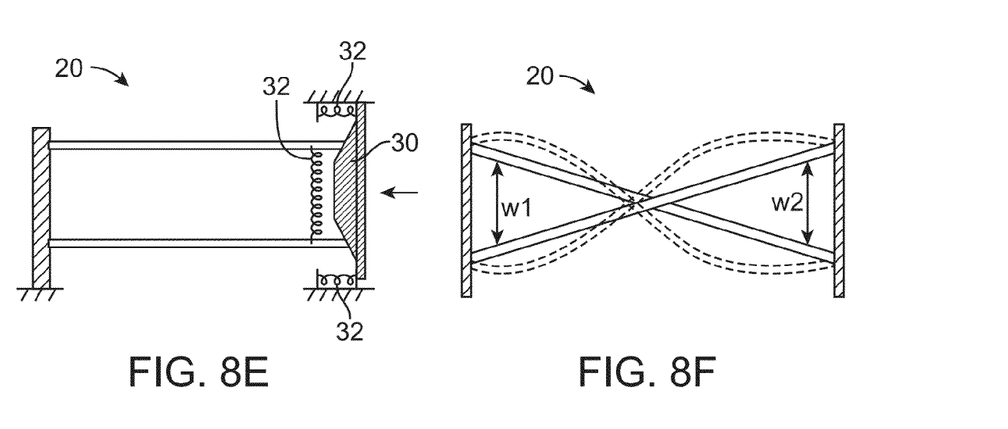

FIG. 8E illustrates a cord pair having crossed cords so as to create two interrelated spaces between adjacent cords in which two separate latch pins 10 may be inserted. The gap distance in each space w1 and w2 are interrelated such that inserting a latch pin 10 into the space second opening increases w2, while simultaneously decreasing the gap distance w1 in the other opening. This may be useful as the locking/retention forces can be adjusted by using at least one latch pin 10 having a larger profile in the locking portion than the other. Another advantage is that more than a latch pin 10 can be placed in each opening at different times, and can be released at the same time using any of the releasing mechanism described herein. This configuration is particularly useful for devices in which multiple components are attached, and is particularly useful for complex assemblies with limited space for snaps or screws.

Figure 9A:
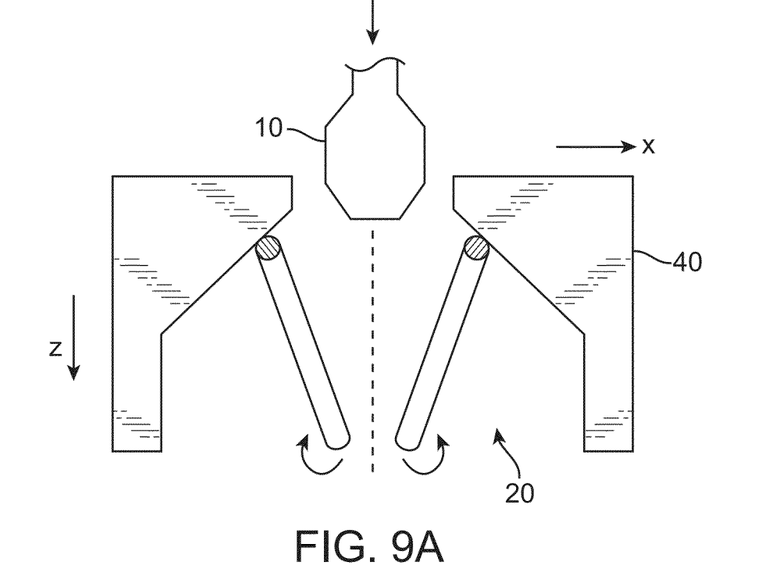
FIGS. 9A-9B illustrate a latch mechanism having a ramp guide.
Figure 9B:
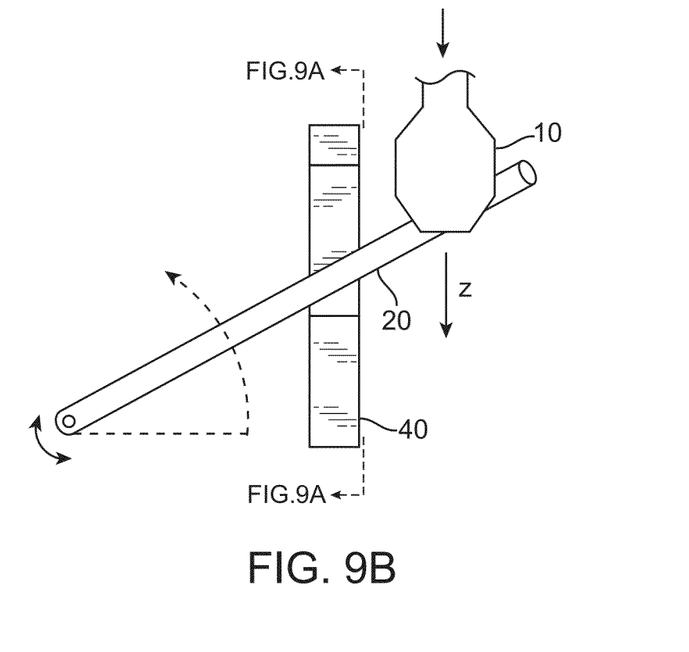

FIGS. 9A-9B illustrate an embodiment in which the pair of deflectable members are rigid members that are biased against a ramp guide 40 near the opposing ends such that insertion of an associated latch member 10 between the cords separates the deflectable members while the bias of the deflectable members against the ramped surface of ramp guide 40 causes the deflectable members to resiliently engage the locking portion of the latch member or insertion pin. One or both deflectable members may be pivotally coupled at one end and torsionally biased, such as with a torsion spring, toward a desired initial position, the torsion spring providing sufficient spring force to bias the deflectable members against the ramp guide 40 into the locking portion of the latch pin 10 while still allowing insertion of the latch pin 10 to deflect and separate the deflectable members 20 (shown by dotted lines in FIG. 9A, a cross-sectional view taken along the edge of ramp guide 40, as shown in FIG. 9B). FIG. 9B shows a side view of the embodiment in FIG. 9A (only one half of the ramp guide being shown along with its associated deflectable member for purposes of clarity).

Figure 10:
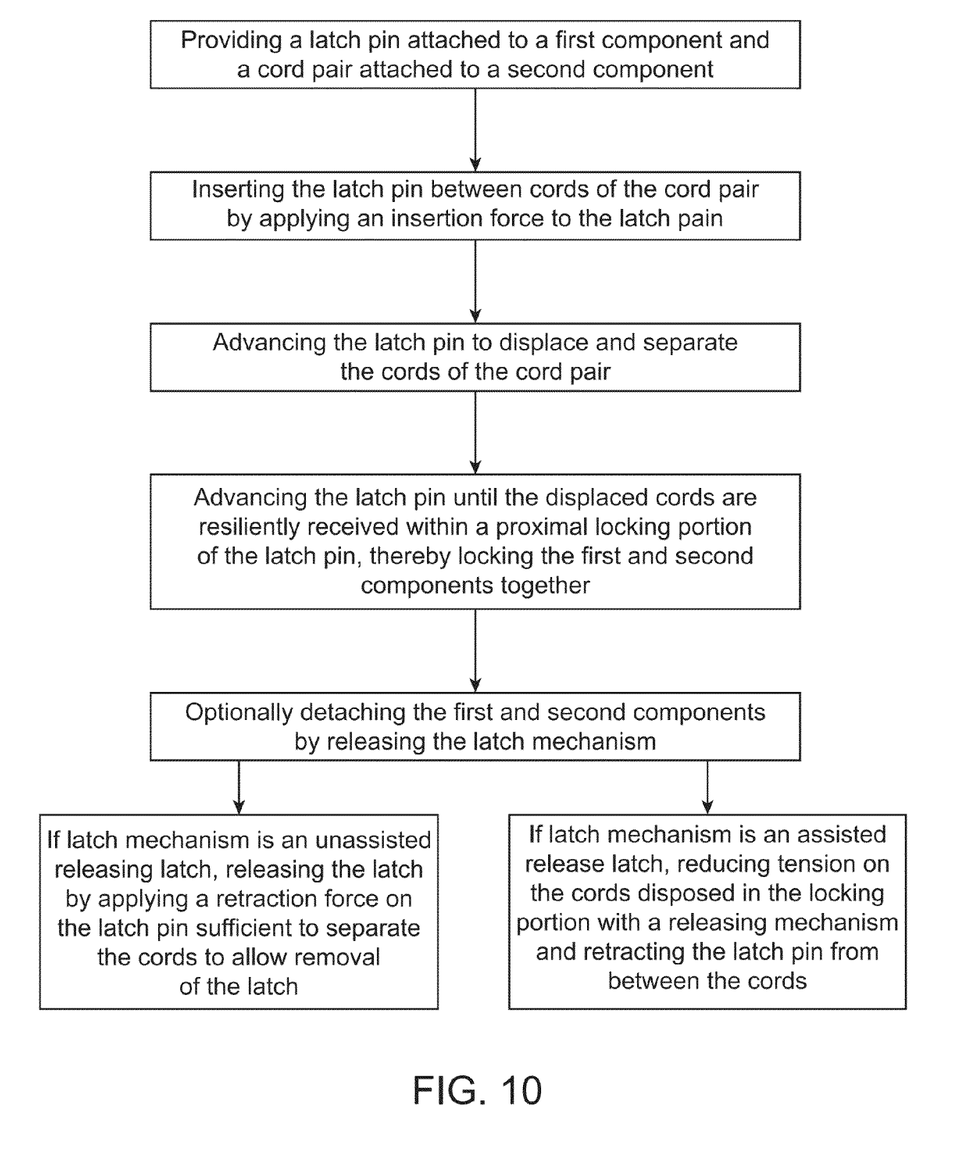
FIG. 10 shows a method for latching components in a device and optionally detaching the components, in accordance with many embodiments.

FIG. 10 illustrates an example method for latching a first and second component, such as an electrical multi-layer board 210, and a second component, such as an exterior device housing component 220. An example method includes: providing a latch pin attached to a first component and a cord pair attached to a second component; inserting the latch pin between cords of the cord pair by applying an insertion force to the latch pain; advancing the latch pin to displace and separate the cords of the cord pair; and advancing the latch pin until the displaced cords are resiliently received within a proximal locking portion of the latch pin, thereby locking the first and second components together. Optionally, if a user, such as a service technician desires to release the latching mechanism to disassemble the device or to service the components, the method may include a step of detaching the first and second components. If the latch mechanism is an unassisted releasing latch, detaching the first and second components may include releasing the latch by applying a retraction force on the latch pin sufficient to separate the cords to allow removal of the latch. If the latch mechanism is an assisted release latch mechanism, reducing tension on the cords disposed in the locking portion with a releasing mechanism and retracting the latch pin from between the cords Although in many of the embodiments described herein, the latch member is described as a latch pin having a generally cylindrical shape, it is appreciated that the latch member may be dimensioned in a variety of differing shapes and still be in accordance with the principles and scope of the invention as described herein. For example, the latch member may be formed as a prism, or a ridge having a width greater than its length, and still function as described in many of the embodiments described herein. Additionally, it is appreciated that the deflectable member may include a number of variations and still be in keeping with the principles of the invention as described herein.

While the above is a complete description of the preferred embodiments of the invention, various alternatives, modifications, and equivalents may be used. The various features of the embodiments disclosed herein may be combined or substituted with one another. Therefore, the above description should not be taken as limiting in scope of the invention which is defined by the appended claims.

What is claimed is:

1. A latch mechanism for attaching components of an electronic device, the latch mechanism comprising:
    at least one pair of deflectable members in which the deflectable members are disposed adjacent and spaced apart from each other, wherein each deflectable member is coupled to an inner wall surface within an interior cavity of an exterior housing of the electronic device on a portion of the deflectable member outside a portion being deflected, each deflectable member being biased to hold an initial position; and
    a latch member protruding from a first component, the latch member comprising a latch pin having a distal insertion portion for inserting between a respective pair of the at least one pair of deflectable members along an insertion axis extending along a longitudinal axis of the latch member and a locking portion proximal of the distal insertion portion for receiving the respective pair of deflectable members, the distal insertion portion being dimensioned so as to facilitate insertion of the latch member between the deflectable members and to deflect the deflectable members away from one another, and the locking portion being dimensioned to receive the deflectable members in a locked position upon advancement of the latch member between the deflectable members to inhibit retraction of the latch member from between the deflectable members, thereby attaching the first component and the exterior housing of the electronic device, the deflectable members being deflectable along a direction component perpendicular to the insertion axis and away from one another to facilitate insertion of the latch member and being deflectable along a direction component parallel to the longitudinal axis when in the locked position,
    wherein, when the latch member is in the locked position, the deflectable members are substantially parallel to each other and substantially orthogonal to the longitudinal axis of the latch member.

2. The latch mechanism of claim 1, wherein the at least one pair of deflectable members are separated by an initial separation distance before displacement, and
    wherein the distal insertion portion is tapered from a first insertion profile along the insertion axis to an intermediate portion having a second insertion profile, the first insertion profile being less than the first separation distance to facilitate insertion of the latch member between the deflectable members, and the second insertion profile being greater than the first separation distance to facilitate deflection of the deflectable members.

3. The latch mechanism of claim 2, wherein the locking portion has a third profile along the insertion axis, the third insertion profile being less than the second profile of the intermediate portion so as to facilitate receiving of the deflectable members therein when the inserted latch member is advanced beyond the intermediate portion.

4. The latch mechanism of claim 3, wherein the distal insertion portion comprises at least two insertion faces corresponding to deflectable members of a respective pair of the at least one pair of deflectable members, wherein the at least two insertion faces are angled so as to control a peak insertion force required to insert the latch member between and deflection of the deflectable members.

5. The latch mechanism of claim 4, wherein the locking portion comprises a proximal taper from the second profile of the intermediate portion to the third profile, wherein the locking portion comprises at least two locking faces corresponding to the respective pair of deflectable members, wherein the at least two locking faces are angled relative to an axis along which the latch member is retractable so as to control a peak retraction force required to retract the latch member from between the deflectable member once resiliently received within the locking portion.

6. The latch mechanism of claim 5, wherein the locking faces are angled relative to the retraction axis so as to provide a peak refraction force between 4 and 8 kgf.

7. The latch mechanism of claim 5, wherein the insertion faces are angled relative to the insertion axis and the locking faces are angled relative to the retraction axis so as to provide a ratio of peak insertion force to peak retraction force of between 1/10 and 1.

8. The latch mechanism of claim 4, wherein the insertion faces are angled relative to the insertion axis so as to provide a peak insertion force between 0.2 kgf and 4 kgf.

9. The latch mechanism of claim 1, wherein each deflectable member of a respective pair of the at least one pair of deflectable members extends in a direction substantially orthogonal to the axis along which the latch member is inserted and are substantially parallel to one another.

10. A latch mechanism for attaching components of an electronic device, the latch mechanism comprising:
at least one pair of deflectable members in which the deflectable members are disposed adjacent and spaced apart from each other, wherein each deflectable member is coupled to an inner wall surface within an interior cavity of an exterior housing of the electronic device on a portion of the deflectable member outside a portion being deflected, wherein each pair of deflectable members is secured such that the deflectable members are biased to hold an initial position and the deflectable members extend along a common plane substantially orthogonal to an insertion axis when in the initial position; and
a latch member protruding from a first component, the latch member comprising a latch in having a distal insertion portion for inserting between deflectable members of a respective pair of the at least one pair of deflectable members along the insertion axis extending along a longitudinal axis of the latch member and a locking portion proximal of the distal insertion portion for receiving the at least one pair of deflectable members in a locked position, the distal insertion portion being dimensioned so as to facilitate insertion of the latch member between deflectable members of the respective pair and to deflect the deflectable members away from one another, and the locking portion being dimensioned to receive the deflectable members upon advancement of the latch member between the deflectable members to inhibit retraction of the latch member from between the deflectable members, thereby attaching the first component and the exterior housing of the electronic device, wherein the latch member is insertable between the deflectable members so as to displace the deflectable members away from one another,
wherein, when the latch member is in the locked position, the deflectable members are substantially parallel to each other and substantially orthogonal to the longitudinal axis of the latch member.

11. The latch mechanism of claim 10, wherein the pair of deflectable members comprise a pair of wires drawn taut and substantially parallel.

12. The latch mechanism of claim 10, wherein the insertion portion of the latch pin comprises a distally tapered portion and the locking portion comprises a circumferential groove or recess so as to resiliently receive the deflectable members.

13. A method for attaching components within an electronic device using a latching mechanism, the method comprising:
inserting a latch member protruding from a first component between deflectable members of at least one pair of deflectable members that are disposed adjacent and spaced apart from each other, wherein each deflectable member is attached to an inner wall surface within an interior cavity of an exterior housing of the electronic device on a portion of the deflectable member outside a portion being deflected such that each deflectable member of a respective pair is biased to hold an initial position, the latch member comprising a latch pin having a distal insertion portion for inserting between the deflectable members along an insertion axis extending along a longitudinal axis of the latch member, the insertion increasing separation between the deflectable members by applying an insertion force along the insertion axis between the deflectable members, wherein the deflectable members are deflectable along a direction component perpendicular to the insertion axis away from one another to facilitate insertion of the latch member; and
attaching the latch member to the respective pair by advancing the latch member between the deflectable members until the deflectable members are received within a locking portion of the latch member proximal of the distal insertion portion in a locked position, wherein the at least two deflectable members are deflectable along a direction component parallel to the longitudinal axis when in the locked position to allow slight movement of the latch member to absorb impact forces and provide shock-resistance,
wherein, when the latch member is in the locked position, the deflectable members are substantially parallel to each other and substantially orthogonal to the longitudinal axis of the latch member.

14. The method of claim 13 wherein inserting the latch member comprises inserting an insertion portion of the latch member along the insertion axis, the insertion portion having a reduced profile along the insertion axis to facilitate insertion between the deflectable members.

15. The method of claim 14 wherein inserting the latch member further comprises advancing the latch member along the insertion axis until an intermediate portion having a dimension greater than an initial gap distance between the deflectable members separates the deflectable members.

16. The method of claim 14 wherein the locking portion has a reduced profile along the insertion axis relative to the intermediate portion so as to resiliently receive deflectable members displaced by advancing the intermediate portion therebetween.

17. The method of claim 14 further comprising:
detaching the first component from the exterior housing of the electronic device by applying a refraction force along a retraction axis sufficient to separate the deflectable members to allow retraction of the latch member from between the deflectable members, wherein the retraction force is greater than the insertion force.

* * * * *

UNITED STATES PATENT AND TRADEMARK OFFICE
CERTIFICATE OF CORRECTION

PATENT NO.         : 9,077,795 B2  
APPLICATION NO.    : 13/421487  
DATED              : July 7, 2015  
INVENTOR(S)        : Kiple et al.

Page 1 of 1

It is certified that error appears in the above-identified patent and that said Letters Patent is hereby corrected as shown below:

In the claims

Column 13, Line 3, Claim 6 delete "refraction" and insert --retraction--.

Column 12, Line 32, Claim 10 delete "latch in" and insert --latch pin--.

Column 14, Line 56, Claim 17 delete "refraction" and insert --retraction--.

Signed and Sealed this  
Third Day of November, 2015

Michelle K. Lee  
*Director of the United States Patent and Trademark Office*